(12) United States Patent
Ikarashi

(10) Patent No.: US 11,595,194 B2
(45) Date of Patent: Feb. 28, 2023

(54) SECURE AGGREGATE SUM SYSTEM, SECURE COMPUTATION APPARATUS, SECURE AGGREGATE SUM METHOD, AND PROGRAM

(71) Applicant: NIPPON TELEGRAPH AND TELEPHONE CORPORATION, Tokyo (JP)

(72) Inventor: Dai Ikarashi, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 38 days.

(21) Appl. No.: 17/049,341

(22) PCT Filed: Apr. 22, 2019

(86) PCT No.: PCT/JP2019/016985
§ 371 (c)(1),
(2) Date: Oct. 21, 2020

(87) PCT Pub. No.: WO2019/208484
PCT Pub. Date: Oct. 31, 2019

(65) Prior Publication Data
US 2021/0058239 A1 Feb. 25, 2021

(30) Foreign Application Priority Data
Apr. 25, 2018 (JP) .............................. JP2018-084114

(51) Int. Cl.
*H04L 9/08* (2006.01)
*G06F 7/08* (2006.01)
*G06F 7/24* (2006.01)

(52) U.S. Cl.
CPC ................ *H04L 9/085* (2013.01); *G06F 7/08* (2013.01); *G06F 7/24* (2013.01)

(58) Field of Classification Search
CPC ............... G06F 7/08; G06F 7/24; H04L 9/085
See application file for complete search history.

(56) References Cited

U.S. PATENT DOCUMENTS

| 11,057,209 B2 * | 7/2021 | Kariv ...................... H04L 9/085 |
| 11,062,215 B2 * | 7/2021 | Laine ...................... G06N 5/04 |
| 11,070,374 B2 * | 7/2021 | Kariv ...................... H04L 63/12 |

OTHER PUBLICATIONS

Karashi et al., "Secure Database Operations Using an Improved 3-party Verifiable Secure Function Evaluation", The 2011 Symposium on Cryptography and Information Security, Kokura, Japan, The Institute of Electronics, Information and Communication Engineers, Jan. 25-28, 2011, 20 pages including English Translation.

* cited by examiner

*Primary Examiner* — Ashokkumar B Patel
*Assistant Examiner* — William B Jones
(74) *Attorney, Agent, or Firm* — Xsensus LLP

(57) ABSTRACT

An aggregate sum is efficiently obtained while keeping confidentiality. A prefix-sum part computes a prefix-sum from a share of a sorted value attribute. A flag converting part converts a format of a share of a flag representing the last element of a group. A flag applying part generates a share of a vector in which a prefix-sum is set when a flag representing the last element of a group is true, and a sum of the whole is set when the flag is false. A sorting part generates a share of a sorted vector obtained by sorting a vector with a permutation which moves elements so that the last elements of each group are sequentially arranged from beginning. A sum computing part generates a share of a vector representing a sum for each group.

5 Claims, 4 Drawing Sheets

SECURE AGGREGATE SUM SYSTEM, SECURE COMPUTATION APPARATUS, SECURE AGGREGATE SUM METHOD, AND PROGRAM

CROSS-REFERENCE TO RELATED APPLICATIONS

The present application is based on PCT filing PCT/JP2019/016985, filed Apr. 22, 2019, which claims priority to JP 2018-084114, filed Apr. 25, 2018, the entire contents of each are incorporated herein by reference.

TECHNICAL FIELD

The present invention relates to a secure computation technique, and, particularly, relates to a technique of computing an aggregate function while keeping confidentiality.

BACKGROUND ART

An aggregate function is an operation for obtaining statistics grouped based on a value of a key attribute when a table includes a key attribute and a value attribute. The aggregate function is also referred to as a group-by operation. The key attribute is an attribute to be used for grouping records of the table, and, examples of the key attribute can include, for example, an official position, gender, or the like. The value attribute is an attribute to be used for computing statistics, and, examples of the value attribute can include, for example, salary, body height, or the like. The group-by operation is, for example, an operation for obtaining average body height by gender in a case where the key attribute is gender, or the like. The key attribute may be a composite key including a plurality of attributes, and, for example, in a case where the key attributes are gender and age, the group-by operation may be an operation for obtaining average body height of males in their teens, average body height of males in their twenties, . . . . Non-patent literature 1 discloses a method for performing the group-by operation using secure computation.

The aggregate sum is one of aggregate functions, and is an operation for counting a sum of a desired value attribute for each group when a table is grouped based on a value of a key attribute. The aggregate sum is also referred to as a group-by sum. The group-by sum is an operation for, for example, when the key attributes are gender and age, obtaining a total amount of salary of males in their teens, a total amount of salary of males in their twenties, . . . .

By using the group-by sum, it is possible to compute a group-by multiply accumulate for obtaining a sum of multiplication for each group and compute a group-by square sum for obtaining a sum of square for each group. In a case of a group-by multiply accumulate, it is only necessary to obtain a group-by sum for a result obtained by performing multiplication on a value attribute of each record. Further, in a case of a group-by square sum, it is only necessary to obtain a group-by sum for a result obtained by performing square on a value attribute of each record in a similar manner.

PRIOR ART LITERATURE

Non-Patent Literature

Non-patent literature 1: Dai Ikarashi, Koji Chida, Koki Hamada, and Katsumi Takahashi, "Secure Database Operations Using An Improved 3-party Verifiable Secure Function Evaluation", The 2011 Symposium on Cryptography and information Security, 2011.

SUMMARY OF THE INVENTION

Problems to be Solved by the Invention

In a conventional secure computation technique, the number of times of communication required to obtain a group-by sum is log(n) where n is the number of subjects to be computed, which is inefficient.

In view of the technical problem as described above, an object of the present invention is to provide a technique which is capable of efficiently obtaining a group-by sum while keeping confidentiality.

Means to Solve the Problem

To solve the above-described problem, a secure aggregate sum system according to one aspect of the present invention is a secure aggregate sum system comprising a plurality of secure computation apparatuses, m being an integer equal to or greater than 2, $[v]:=[v_0], \ldots, [v_{m-1}]$ being a share obtained by secret sharing a desired value attribute $v:=v_0, \ldots, v_{m-1}$ when a table including a key attribute and a value attribute is sorted based on a value of the key attribute, $[e]:=[e_0], \ldots, [e_{m-1}]$ being a share obtained by secret sharing a flag $e:=e_0, \ldots, e_{m-1}$ indicating that a last element of each group is true and other elements are false when the table is grouped based on the value of the key attribute, $\{\{\sigma\}\}$ being a share obtained by secret sharing a permutation $\sigma$ which moves elements so that the last elements of each group are sequentially arranged from beginning when the table is grouped based on the value of the key attribute, and g being a maximum number of the groups, each of the secure computation apparatuses comprising: a prefix-sum part configured to generate a share $[v']$ which becomes a vector $v':=v'_0, \ldots, v'_{m-1}$, when reconstructed, by setting a sum from $v_0$ to $v_i$ at $v'_i$ for each integer i equal to or greater than 0 and equal to or less than m−1 using the share $[v]$, a flag applying part configured to generate a share $[t]$ which becomes a vector $t:=t_0, \ldots, t_{m-1}$, when reconstructed, by setting $[v'_i]$ at $[t_i]$ if $[e_i]$ is true, and setting $[v'_{m-1}]$ at $[t_i]$ if $[e_i]$ is false for each integer i equal to or greater than 0 and equal to or less than m−1 using the share $[v']$ and the share $[e]$, a sorting part configured to generate a share $[\sigma(t)]$ which becomes a sorted vector $\sigma(t)$ obtained by sorting the vector t with the permutation $\sigma$, when reconstructed, using the share $[t]$ and the share $\{\{\sigma\}\}$, and a sum computing part configured to generate a share $[s]$ which becomes a vector $s:=s_0, \ldots, s_{min(g, m)-1}$ representing a sum of a value attribute v for each group, when reconstructed, by setting $[s_i]:=[\sigma(t)_i - \sigma(t)_{i-1}]$ for each integer i equal to or greater than 1 and equal to or less than min(g, m)−1, and setting $[s_0]:=[\sigma(t)_0]$ using the share $[\sigma(t)]$.

Effect of the Invention

According to a secure aggregate sum technique of the present invention, it is possible to efficiently obtain a group-by sum with the number of times of communication of O(1) while keeping confidentiality.

DETAILED DESCRIPTION OF THE EMBODIMENTS

Figure 1:
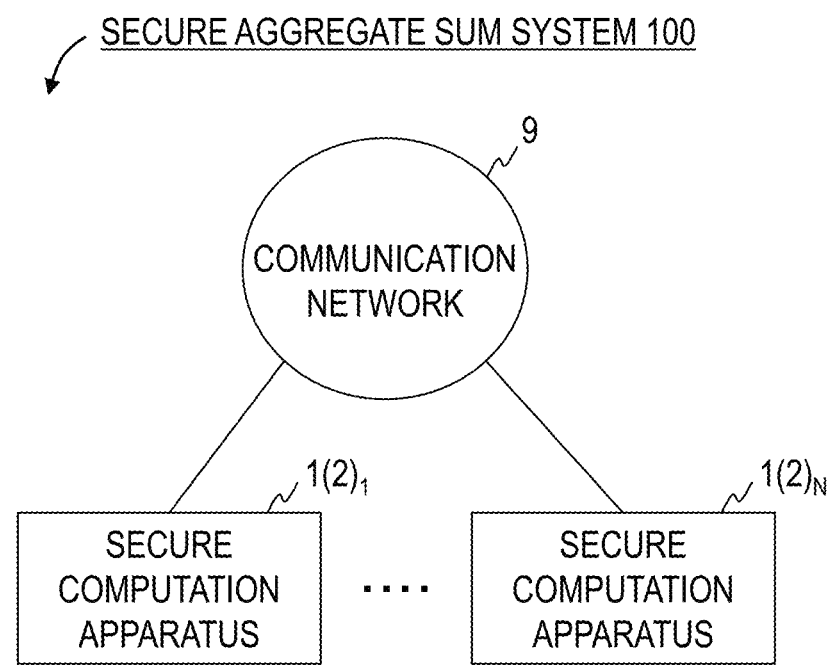
FIG. 1 is a diagram illustrating a functional configuration of a secure aggregate sum system.

Embodiments of the present invention will be described in detail below. Note that the same reference numerals will be assigned to components having the same functions in the drawings, and overlapped description will be omitted.

$[x] \in [F]$ indicates that a certain value x is concealed through secret sharing, or the like, on an arbitrary ring F. $\{b\} \in \{B\}$ indicates that a certain value b of one bit is concealed through secret sharing, or the like, on a ring B which can represent one bit. $\{\{s\}\} \in \{\{S_m\}\}$ indicates that a certain permutation s which belongs to a set $S_m$ of permutations of m elements is concealed through secret sharing, or the like. Hereinafter, a secret shared value will be referred to as a "share".

In sort processing (including stable sort) in secure computation used in the embodiment, for example, sort disclosed in the following Reference literature 1 can be used. Concerning the share $\{\{s\}\}$ of the permutation 5, it is only necessary to use a hybrid permutation $\{\{\pi\}\}$ disclosed in the following Reference literature 1.

[Reference literature 1] Dai Ikarashi, Koki Hamada, Ryo Kikuchi, and Koji Chida, "A Design and an Implementation of Super-high-speed Multi-party Sorting: The Day When Multi-party Computation Reaches Scripting Languages", Computer Security Symposium 2017.

Embodiment

A configuration example of the secure aggregate sum system 100 of the embodiment will be described with reference to FIG. 1. The secure aggregate sum system 100 includes N(≥2) secure computation apparatuses $1_1, \ldots, 1_N$. In the present embodiment, the secure computation apparatuses $1_1, \ldots, 1_N$ are respectively connected to a communication network 9. The communication network 9 is a communication network of a circuit switching system or a packet switching system, configured so that respective connected apparatuses can perform communication with each other, and, for example, the Internet, a local area network (LAN), a wide area network (WAN), or the like, can be used. Note that the respective apparatuses do not necessarily have to be able to perform communication online via the communication network 9. For example, it is also possible to employ a configuration where information which is to be input to the secure computation apparatuses $1_1, \ldots, 1_N$ is stored in a portable recording medium such as a magnetic tape and a USB memory, and the information is input from the portable recording medium to the secure computation apparatuses $1_1, \ldots, 1_N$ offline.

Figure 2:
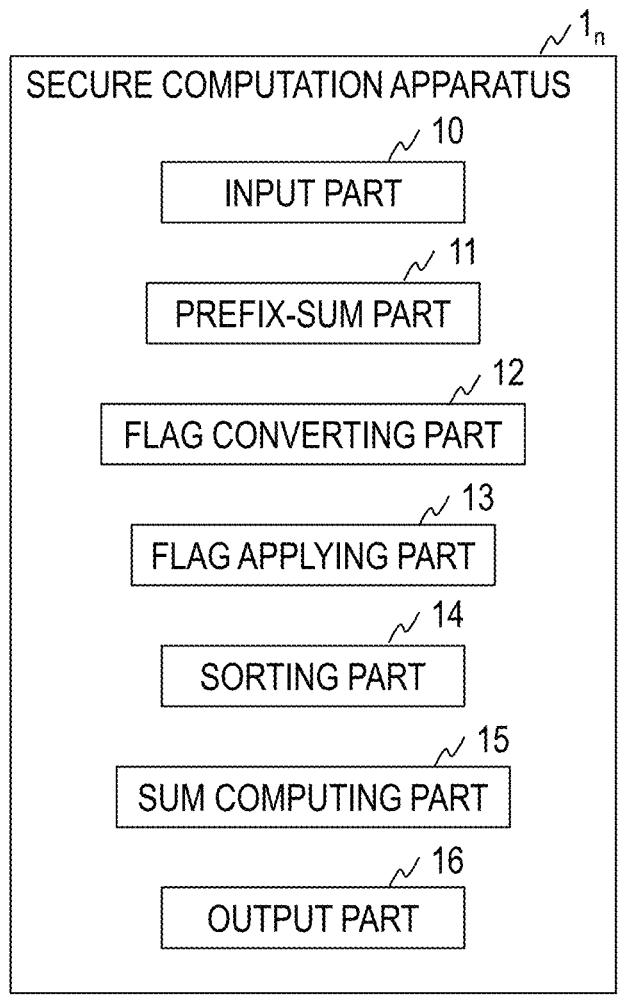
FIG. 2 is a diagram illustrating a functional configuration of a secure computation apparatus.

A configuration example of the secure computation apparatuses $1_n$ (n=1, . . . , N) included in the secure aggregate sum system 100 will be described with reference to FIG. 2. For example, as illustrated in FIG. 2, the secure computation apparatus $1_n$ includes an input part 10, a prefix-sum part 11, a flag converting part 12, a flag applying part 13, a sorting part 14, a sum computing part 15, and an output part 16. By this secure computation apparatus $1_n$(1≤n≤N) performing processing in each step which will be described later while cooperating with other secure computation apparatuses $1_{n'}$ (n'=1, . . . , N, where n≠n'), the secure aggregate sum method of the embodiment is realized.

The secure computation apparatus $1_n$ is a special apparatus configured by a special program being loaded to a publicly-known or dedicated computer having, for example, a central processing unit (CPU), a main memory (RAM: random access memory), or the like. The secure computation apparatus $1_n$, for example, executes respective kinds of processing under control by the central processing unit. Data input to the secure computation apparatus $1_n$ and data obtained through the respective kinds of processing are stored in, for example, the main memory, and the data stored in the main memory is read out to the central processing unit as necessary and is utilized for other processing. At least part of respective processing parts of the secure computation apparatus $1_n$ may be configured with hardware such as an integrated circuit.

Figure 3:
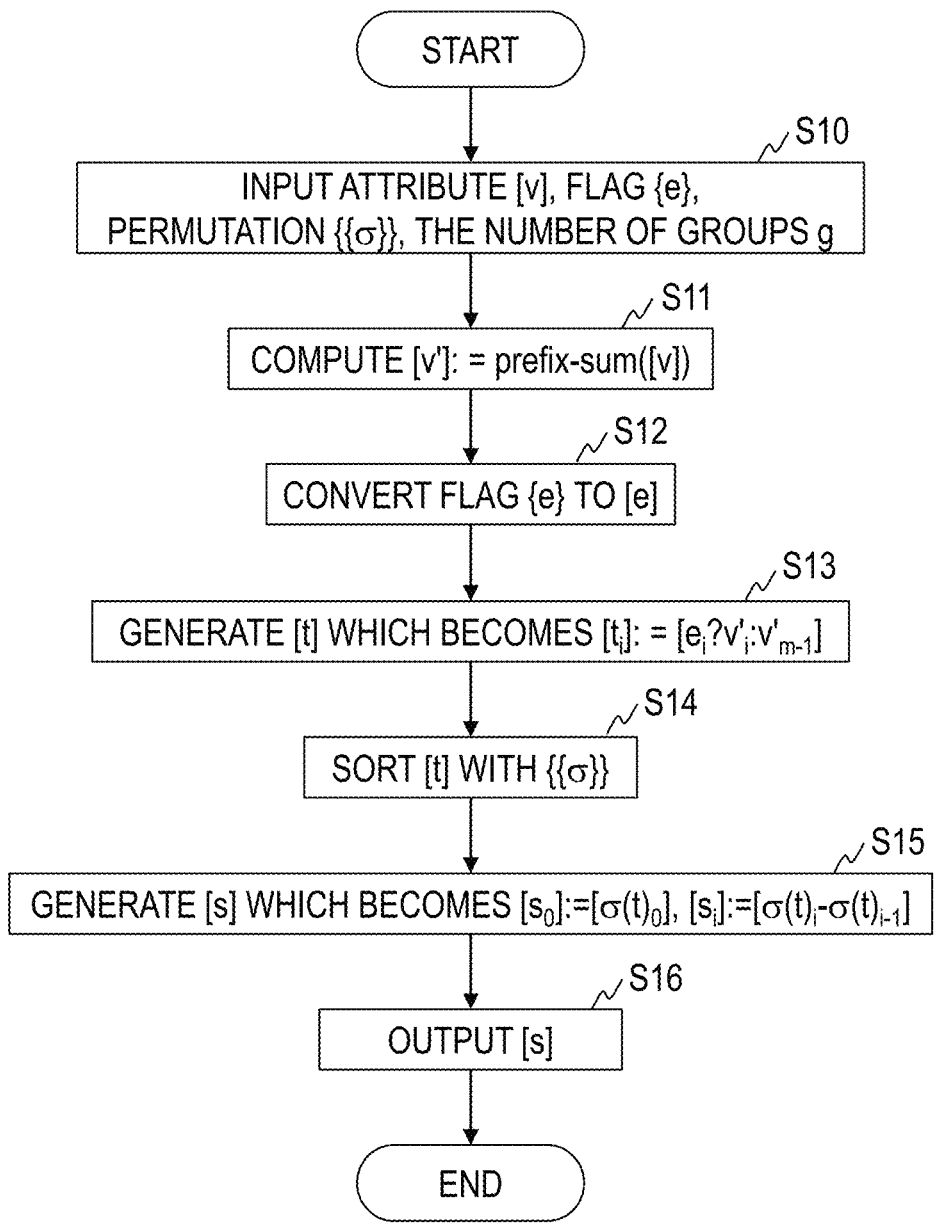
FIG. 3 is a diagram illustrating a processing procedure of a secure aggregate sum method.

A processing procedure of the secure aggregate sum method to be executed by the secure aggregate sum system 100 of the embodiment will be described with reference to FIG. 3.

In step S10, the input part 10 of each secure computation apparatus $1_n$ receives a share $[v] \in [F]^m$ obtained by concealing a value attribute $v \in F^m$ which has been sorted with the key attribute through secret sharing, a share $\{e\} \in \{B\}^m$ obtained by concealing a flag $e \in B^m$ through secret sharing, a share $\{\{\sigma\}\} \in \{\{S_m\}\}$ obtained by concealing the permutation σ through secret sharing, and a maximum number of groups g, as inputs. m is an integer equal to or greater than 2. The input part 10 outputs the share [v] of the value attribute v to the prefix-sum part 11, outputs the share {e} of the flag e to the flag converting part 12, and outputs the share $\{\{\sigma\}\}$ of the permutation a to the sorting part 14.

The flag e is a flag representing a boundary of groups. For example, the flag e is a flag such that, when the table is stably sorted with a key attribute, and when records having the same value of the key attribute are put into the same group, a value corresponding to a last element (that is, an element immediately before the boundary of groups) of each group is true (for example, 1), and values corresponding to the other elements are false (for example, 0). Note that stable sort is an operation of storing order of elements of the same value in a case where elements of the same value exist, among sort operations. For example, if a table sorted in order of employee number is stably sorted with gender, a sort result in which order of the employee number is kept in each type of gender can be obtained. Hereinafter, there is a case where each element of $\{e\} \in \{B\}^m$ is referred to by $\{e_i\} \in \{B\}$ (i=0, . . . , m−1).

The permutation σ is a permutation which arranges values of key attributes of each group from the head one by one. For example, the permutation σ is a permutation which moves elements so that, when the table is stably sorted with a key attribute, and when records having the same value of the key attribute are put into the same group, the last elements of each group are sequentially arranged from beginning, and subsequently, other elements are sequentially arranged. The share $\{\{\sigma\}\}$ of the permutation a is only required to be configured using the hybrid permutation $\{\{\pi\}\}$ disclosed in the above-described Reference literature 1.

The maximum number of groups g is the number of combinations of values which the key attribute can take, that is, the number of types of values which the key attribute can take.

In step S11, the prefix-sum part 11 of each secure computation apparatus $1_n$ generates a share $[v'] \in [F]^m$ which becomes a vector $v':=v'_0, \ldots, v'_{m-1} \in F$, when reconstructed, by computing $[v']:=\text{prefix-sum}([v])$ using the share $[v]$ of the value attribute v. Here, prefix-sum is an operation for setting a sum of values from the 0-th element $v_0$ to the i-th element $v_i$ of an input vector v at the i-th element $v'_i$ of an output vector v' for each integer i equal to or greater than 0 and equal to or less than m−1 using in as a length of the input vector v. The prefix-sum part 11 outputs the share $[v']$ of the vector v' to the flag applying part 13.

In step S12, the flag converting part 12 of each secure computation apparatus $1_n$ converts the share $\{e\} \in \{B\}^m$ of the flag e into a share $[e] \in [F]^m$ through secret sharing on an arbitrary ring F. The flag converting part 12 outputs the share $[e]$ of the flag e to the flag applying part 13.

In step S13, the flag applying part 13 of each secure computation apparatus L generates a share $[t] \in [F]^m$ which becomes a vector $t:=t_0, \ldots, t_{m-1} \in F$, when reconstructed, by setting $[t_i]:=[e_i?v'_i: v'_{m-1}]$ for each integer i equal to or greater than 0 and equal to or less than m−1 using the share $[v']$ of the vector v' and the share $[e]$ of the flag e. Here, "?" is a conditional operator (tenary operator). In other words, when $[e_i]$ is true (for example, $[e_i]=[1]$), $[t_i]:=[v'_i]$ is set, while, when $[e_i]$ is false (for example, $[e_i]=[0]$), $[t_i]:=[v'_{m-1}]$ is set. The vector t becomes a vector in which, when the table is stably sorted with the key attribute, records having the same value of the key attribute are put into the same group, at the last element of each group, a sum of values of the value attribute before the element is set, and at the other elements, a sum of values of value attribute of the whole table is set. The flag applying part 13 outputs the share $[t]$ of the vector t to the sorting part 14.

In step S14, the sorting part 14 of each secure computation apparatus $1_n$ generates a share $[\sigma(t)] \in [F]^m$ which becomes a sorted vector $\sigma(t)$ obtained by sorting the vector t with the permutation $\sigma$, when reconstructed, using the share $[t]$ of the vector t and the share $\{\{\sigma\}\}$ of the permutation $\sigma$. Hereinafter, there is a case where each element of $[\sigma(t)] \in [F]^m$ is referred to by $[\sigma(t)_i] \in [F] (i=0, \ldots, m-1)$. The sorting part 14 outputs the share $[\sigma(t)]$ of the sorted vector $\sigma(t)$ to the sum computing part 15.

In step S15, the sum computing part 15 of each secure computation apparatus $1_n$ generates a share $[s] \in [F]^{\min(g, m)}$ which becomes a sum $s:=s_0, \ldots, s_{\min(g, m)-1} \in F$ of the value attribute v for each group, when reconstructed, by setting $[s_i]:=[\sigma(t)_i - \sigma(t)_{i-1}]$ for each integer i equal to or greater than 1 and equal to or less than $\min(g, m)-1$ and setting $[s_0]:=[\sigma(t)_0]$ using the share $[\sigma(t)]$ of the sorted vector $\sigma(t)$. Because a sum of values of the value attribute v belonging to each group of the 0-th group to the i-th group is set at the i-th element $\sigma(t)_i$ of the sorted vector $\sigma(t)$, a sum of values of the value attribute v belonging to the i-th group is set at the i-th element $s_i$ of the vector s. The sum computing part 15 outputs the share $[s]$ of the sum s to the output part 16.

In step S16, the output part 16 of each secure computation apparatus $1_n$ outputs the share $[s]$ of the sum s.

Modification

In the above-described embodiments, a configuration has been described where the share $[v]$ of the value attribute v, the share $\{e\}$ of the flag e, and the share $\{\{\sigma\}\}$ of the permutation $\sigma$ are input to the input part 10. In a modification, a configuration will be described where a share obtained by concealing the table through secret sharing, or the like, is input to the input part 10, and, after the share $[v]$ of the value attribute v, the share $\{e\}$ of the flag e, and the share $\{\{\sigma\}\}$ of the permutation a are obtained, a group-by sum is calculated in accordance with the procedure described in the above-described embodiments.

Figure 4:
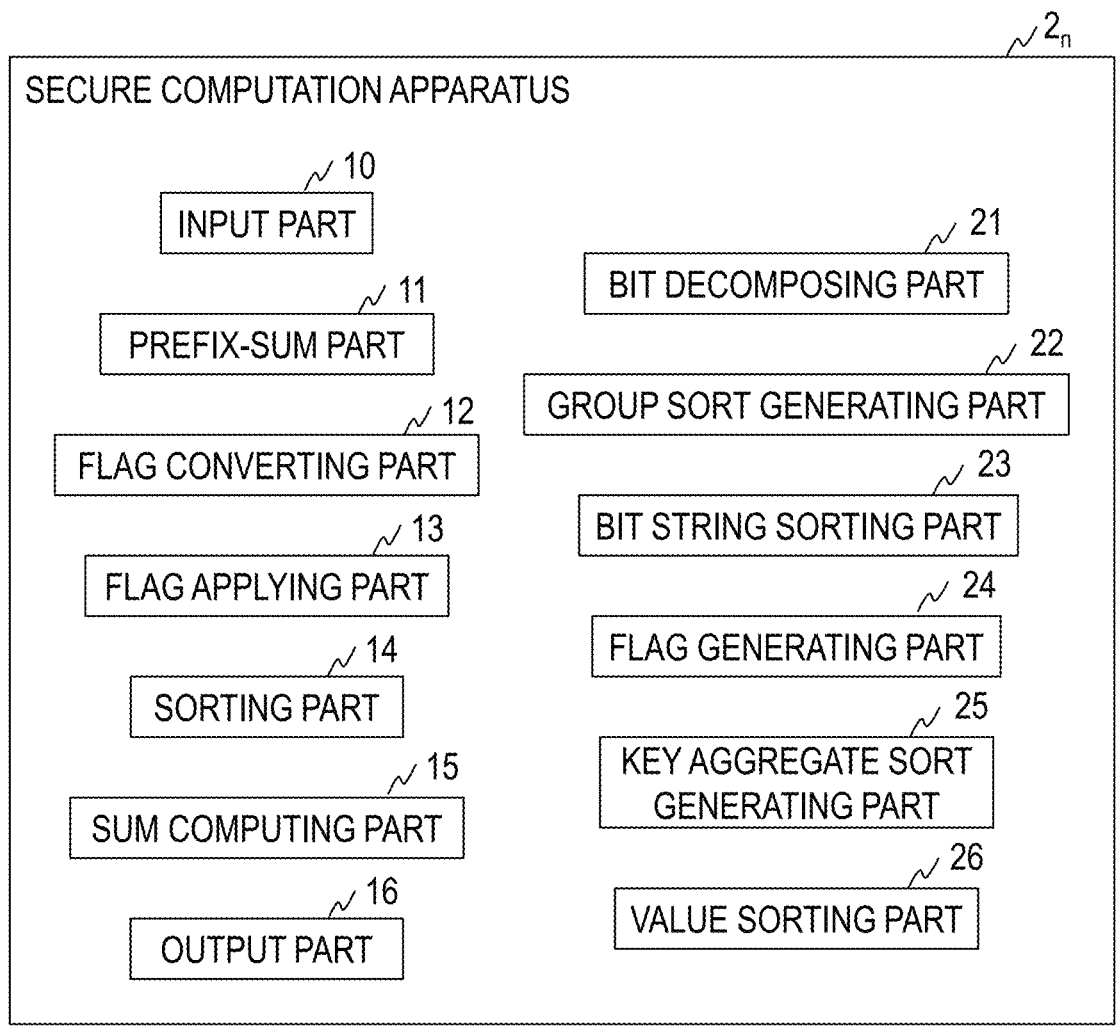
FIG. 4 is a diagram illustrating a functional configuration of a secure computation apparatus of a modification.

For example, as illustrated in FIG. 4, a secure computation apparatus $2_n(n=1, \ldots, N)$ of the modification includes a bit decomposing part 21, a group sort generating part 22, a bit string sorting part 23, a flag generating part 24, a key aggregate sort generating part 25 and a value sorting part 26 in addition to respective processing parts provided at the secure computation apparatus $1_n(n=1, \ldots, N)$ of the embodiment. Only a difference from the secure aggregate sum system 100 of the embodiment will be described below.

The input part 10 of each secure computation apparatus $2_n$ receives a share $[k_0], \ldots, [k_{nk-1}] \in [F]^m$ obtained by concealing each of $n_k$ key attributes $k_0, \ldots, k_{nk-1} \in F^m$ through secret sharing, and a share $[v_0], \ldots, [v_{na-1}] \in [F]^m$ obtained by concealing each of $n_a$ value attributes $v_0, \ldots, v_{na-1} \in F^m$ through secret sharing, as input. However, $n_k$ and $n_a$ are integers equal to or greater than 1. Hereinafter, there is a case where each element of $[k_j] \in [F]^m$ $(j=0, \ldots, n_k-1)$ is referred to by $[k_{j, i}] \in [F]$ $(i=0, \ldots, m-1)$. The input part 10 outputs shares $[k_0], \ldots, [k_{nk-1}]$ of the key attributes $k_0, \ldots, k_{nk-1}$ to the bit decomposing part 21.

The bit decomposing part 21 of each secure computation apparatus $2_n$ bit-decomposes and concatenates the shares $[k_0], \ldots, [k_{nk-1}]$ of the key attributes $k_0, \ldots, k_{nk-1}$ and obtains a share $\{b\} \in \{B\}^\lambda$ which becomes a bit string $b:=b_0, \ldots, b_{m-1} \in B^\lambda$ which is a concatenated bit expression of the key attributes $k_0, \ldots, k_{nk-1}$, when reconstructed. Note that $\lambda$ is a bit length of the bit string b, and a sum of bit lengths of respective $b_i$ $(i=0, \ldots, m-1)$. In other words, $\{b_i\}$ is a bit string obtained by concatenating bit expression of the i-th elements $[k_{0, i}], \ldots, [k_{nk-i}]$ of the respective shares $[k_0], \ldots, [k_{nk-1}]$ of the key attributes $k_0, \ldots, k_{nk-1}$. The bit decomposing part 21 outputs the share $\{b\}$ of the bit string b to the group sort generating part 22.

The group sort generating part 22 of each secure computation apparatus $2_n$ generates a share $\{\{\sigma\}\} \in \{\{S_m\}\}$ which becomes a permutation $\sigma_0$ which stably sorts the bit string b in ascending order, when reconstructed, using the share $\{b\}$ of the bit string b. Because the bit string b is a concatenated bit expression of the key attributes $k_0, \ldots, k_{nk-1}$, it can be said that the permutation $\sigma_0$ is an operation of grouping records by rearranging the records so that records having same values of the key attributes $k_0, \ldots, k_{nk-1}$ are successive. The group sort generating part 22 outputs the share $\{b\}$ of the bit string b and the share $\{\{\sigma_0\}\}$ of the permutation $\sigma_0$ to the bit string sorting part 23. Further, the group sort generating part 22 outputs the share $\{\{\sigma_0\}\}$ of the permutation $\sigma_0$ to the value sorting part 26.

The bit string sorting part 23 of each secure computation apparatus $2_n$ obtains a share $\{b'\} \in \{B\}^\lambda$ which becomes a sorted bit string $b':=b'_0, \ldots, b'_{m-1} \in B^\lambda$ obtained by sorting the bit string b with the permutation $\sigma_0$, when reconstructed, using the share $\{b\}$ of the bit string b and the share $\{\{\sigma\}\}$ of the permutation $\sigma_0$. The bit string sorting part 23 outputs the share $\{b'\}$ of the sorted bit string b' to the flag generating part 24.

The flag generating part 24 of each secure computation apparatus 2 generates a share $\{e\} \in \{B\}^m$ which becomes a flag $e:=e_0, \ldots, e_{m-1} \in B^m$, when reconstructed, by setting $\{e_i\}:=\{b'_i \neq b'_{i+1}\}$ for each integer i equal to or greater than 0 and equal to or less than m−2 and setting $\{e_{m-1}\}:=\{1\}$, using the share $\{b'\}$ of the sorted bit string b'. Because true is set at the flag $e_i$ if the i-th element $b'_i$ of the sorted bit string b' is different from the i+1-th element $b'_{i+1}$, the flag $e_i$ becomes a flag which indicates the last element of each group (that is, an element immediately before the boundary between groups). The flag generating part 24 outputs the share {e} of the flag e to the key aggregate sort generating part 25. Further, the flag generating part 24 outputs the share {e} of the flag e to the flag converting part 12.

The key aggregate sort generating part 25 of each secure computation apparatus $2_n$ first generates a share $\{e'\} \in \{B\}^m$ which becomes a flag e' which is a negation ¬e of the flag e, when reconstructed, using the share {e} of the flag e. In other words, the key aggregate sort generating part 25 sets $\{e'_i\} := \{\neg e_i\}$ for each integer i equal to or greater than 0 and equal to or less than m−1. Then, the key aggregate sort generating part 25 generates a share $\{\{\sigma\}\} \in \{\{S_m\}\}$ which becomes a permutation σ which stably sorts the flag e' in ascending order, when reconstructed, using the share {e'} of the flag e'. The key aggregate sort generating part 25 outputs the share $\{\{\sigma\}\}$ of the permutation σ to the value sorting part 26. Further, the key aggregate sort generating part 25 outputs the share $\{\{\sigma\}\}$ of the permutation σ to the sorting part 14.

The value sorting part 26 of each secure computation apparatus $2_n$ generates shares $[v''_0], \ldots, [v''_{na-1}]$ which become sorted value attributes $v''_0, \ldots, v''_{na-1}$ obtained by sorting value attributes $v_0, \ldots, v_{na-1}$ with the permutation $\sigma_0$, when reconstructed, using shares $[v_0], \ldots, [v_{na-1}]$ of the value attributes $v_0, \ldots, v_{na-1}$ and the share $\{\{\sigma_0\}\}$ of the permutation $\sigma_0$. The value sorting part 26 outputs shares for which it is desired to compute a sum for each group among the shares $[v''_0], \ldots, [v''_{na-1}]$ of the sorted value attributes $v''_0, \ldots v''_{na-1}$, to the prefix-suns part 11 as the share [v] of the value attribute v.

While the embodiments of the present invention have been described above, it goes without saying that a specific configuration is not limited to these embodiments, and design change, or the like, within the scope not deviating from the gist of the present invention are incorporated into the present invention. Various kinds of processing described in the embodiments are executed not only in chronological order in accordance with order of description, but also executed in parallel or individually in accordance with processing performance of apparatuses which execute the processing or as necessary.

Program, Recording Medium

In a case where various kinds of processing functions of the respective apparatuses described in the above-described embodiments are realized with a computer, a processing content of the functions which should be provided at the respective apparatuses is described with a program. Then, by this program being executed with the computer, various kinds of processing functions at the above-described respective apparatuses are realized on the computer.

The program describing this processing content can be recorded in a computer-readable recording medium. As the computer-readable recording medium, any medium such as, for example, a magnetic recording device, an optical disk, a magnetooptical recording medium and a semiconductor memory can be used.

Further, this program is distributed by, fir example, a portable recording medium such as a DVD and a CD-ROM in which the program is recorded being sold, given, lent, or the like. Still further, it is also possible to employ a configuration where this program is distributed by the program being stored in a storage device of a server computer and transferred from the server computer to other computers via a network.

A computer which executes such a program, for example, first, stores a program recorded in the portable recording medium or a program transferred from the server computer in the storage device of the own computer once. Then, upon execution of the processing, this computer reads out the program stored in the storage device of the own computer and executes the processing in accordance with the read program. Further, as another execution form of this program, the computer may directly read a program from the portable recording medium and execute the processing in accordance with the program, and, further, sequentially execute the processing in accordance with the received program every time the program is transferred from the server computer to this computer. Further, it is also possible to employ a configuration where the above-described processing is executed by so-called ASP (Application Service Provider) type service which realizes processing functions only by an instruction of execution and acquisition of a result without the program being transferred from the server computer to this computer. Note that, it is assumed that the program in the present embodiment includes information which is to be used for processing by an electronic computer, and which is equivalent to a program (not a direct command to the computer, but data, or the like, having property specifying processing of the computer).

Further, while, in this embodiment, the present apparatus is constituted by a predetermined program being executed on the computer, at least part of the processing content may be realized with hardware.

What is claimed is:

1. A secure aggregate sum system comprising a plurality of secure computation apparatuses,
    m being an integer equal to or greater than 2, [v]: = $[v_0], \ldots, [v_{m-1}]$ being a share obtained by secret sharing a desired value attribute v: $=v_0, \ldots, v_{m-1}$ when a table including a key attribute and a value attribute is sorted based on a value of the key attribute, [e]: = $[e_0], \ldots, [e_{m-1}]$ being a share obtained by secret sharing a flag e: $=e_0, \ldots, e_{m-1}$ indicating that a last element of each group is true and other elements are false when the table is grouped based on the value of the key attribute, $\{\{\sigma\}\}$ being a share obtained by secret sharing a permutation σ which moves elements so that the last elements of each group are sequentially arranged from beginning when the table is grouped based on the value of the key attribute, and g being a maximum number of the groups,
    each of the secure computation apparatuses comprising processing circuitry configured to securely:
    generate a share [v'] which becomes a vector v': = $v'_0, \ldots, v'_{m-1}$, when reconstructed, by setting a sum from $v_0$ to $v_i$ at for each integer i equal to or greater than 0 and equal to or less than m−1 using the share [v];
    generate a share [t] which becomes a vector t: $=t_0, \ldots, t_{m-1}$, when reconstructed, by setting $[v'_i]$ at $[t_i]$ if $[e_i]$ is true, and setting $[v'_{m-1}]$ at $[t_i]$ if $[e_i]$ is false for each integer i equal to or greater than 0 and equal to or less than m−1 using the share [v'] and the share [e];
    generate a share $[\sigma(t)]$ which becomes a sorted vector $\sigma(t)$ obtained by sorting the vector t with the permutation σ, when reconstructed, using the share [t] and the share $\{\{\sigma\}\}$; and
    generate a share [s] which becomes a vector s: $=s_0, \ldots, s_{min(g, m)-1}$ representing a sum of a value attribute v for each group, when reconstructed, by setting $[s_i]$: $=[\sigma(t)_i - \sigma(t)_{i-1}]$ for each integer i equal to or greater than 1 and equal to or less than min(g, m)−1, and setting $[s_0]:=[\sigma(t)_0]$ using the share $[\sigma(t)]$, wherein the processing circuitry of said each of the plurality of secure computation apparatuses is configured to:

receive $[v]$, $[e]$ and $\{\{\sigma\}\}$ through secret sharing, and output the share $[s]$.

2. The secure aggregate sum system according to claim 1, wherein F is an arbitrary ring, nk is an integer equal to or greater than 1, $[k_0], \ldots, [k_{nk-1}]$ are shares obtained by secret sharing key attributes $k_0, \ldots, k_{nk-1} \in F^m$, and $[v'']$ is a share obtained by secret sharing a desired value attribute $v'' \in F^m$ before the table is sorted based on the value of the key attribute, and the processing circuitry is further configured to:

generate a share $\{\{\sigma_0\}\}$ which becomes a permutation $\sigma_0$ which stably sorts a bit string b in ascending order, when reconstructed, from a share $\{b\}$ which becomes the bit string b: $=b_0, \ldots, b_{m-1}$, obtained by bit-decomposing and concatenating the key attributes $k_0, \ldots, k_{nk-1}$, when reconstructed, using the shares $[k_0], \ldots, [k_{nk-1}]$;

generate a share $\{b'\}$ which becomes a sorted bit string $b': =b'_0, \ldots, b'_{m-1}$ obtained by sorting the bit string b with the permutation $\sigma_0$, when reconstructed, using the share $\{\sigma\}$ and the share $\{\{\sigma_0\}\}$;

generate the share $\{e\}$ which becomes the flag e: $=e_0, \ldots, e_{m-1}$, when reconstructed, by setting $\{e_i\}: =\{b'_i \neq b'_{i+1}\}$ for each integer i equal to or greater than 0 and equal to or less than m−2, and setting $\{e_{m-1}\}: =\{1\}$, using the share $\{b'\}$;

generate the share $\{\{\sigma\}\}$ which becomes the permutation $\sigma$ which stably sorts a negation e of the flag e in ascending order, when reconstructed, using the share $\{e\}$; and generate a share $[v]$ which becomes the value attribute v obtained by sorting the value attribute v" with the permutation $\sigma_0$, when reconstructed, using the share $[v'']$ and the share $\{\{\sigma_0\}\}$.

3. A secure computation apparatus, m being an integer equal to or greater than 2, $[v]$: $[v_0], \ldots, [v_{m-1}]$ being a share obtained by secret sharing a desired value attribute v: $=v_0, \ldots, v_{m-1}$ when a table including a key attribute and a value attribute is sorted based on a value of the key attribute, $[e]$: $=[e_0], \ldots, [e_{m-1}]$ being a share obtained by secret sharing a flag e: $=e_0, \ldots, e_{m-1}$ indicating that a last element of each group is true and other elements are false when the table is grouped based on the value of the key attribute, $\{\{\sigma\}\}$ being a share obtained by secret sharing a permutation $\sigma$ which moves elements so that the last elements of each group are sequentially arranged from beginning when the table is grouped based on the value of the key attribute, and g being a maximum number of the groups, the secure computation apparatus comprising processing circuitry configured to securely:

generate a share $[V']$ which becomes a vector v': $= v'_0, \ldots, v'_{m-1}$, when reconstructed, by setting a sum from $v_0$ to $v_i$ at $v'_i$ for each integer i equal to or greater than 0 and equal to or less than m−1 using the share $[v]$;

generate a share $[t]$ which becomes a vector t: $=t_0, \ldots, t_{m-1}$, when reconstructed, by setting $[v']$ at $[t_i]$ if $[e_i]$ is true, and setting $[v'_{m-1}]$ at $[t_i]$ if $[e_i]$ is false for each integer i equal to or greater than 0 and equal to or less than m−1 using the share $[V']$ and the share $[e]$;

generate a share $[\sigma(t)]$ which becomes a sorted vector $\sigma(t)$ obtained by sorting the vector t with the permutation $\sigma$, when reconstructed, using the share $[t]$ and the share $\{\{\sigma\}\}$; and generate a share $[s]$ which becomes a vector s: $=s_0, \ldots, s_{min(g, m)-1}$ representing a sum of value attributes v for each group, when reconstructed, by setting $[s_i]$: $[\sigma(t)_i - \sigma(t)_{i-1}]$ for each integer i equal to or greater than 1 and equal to or less than min(g, m)−1 and setting $[s_0]: =[\sigma(t)_0]$ using the share $[\sigma(t)]$, wherein the processing circuitry of said each of the plurality of secure computation apparatuses is configured to receive $[v]$, $[e]$, and $\{\{\sigma\}\}$ through secret sharing, and output the share $[s]$.

4. Secure aggregate sum method to be executed by a secure aggregate sum system comprising a plurality of secure computation apparatuses, m being an integer equal to or greater than 2, $[v]$: $=[v_0], \ldots, [v_{m-1}]$ being a share obtained by secret sharing a desired value attribute v: $v_0, \ldots, v_{m-1}$ when a table including a key attribute and a value attribute is sorted based on a value of the key attribute, $[e]$: $=[e_0], \ldots, [e_{m-1}]$ being a share obtained by secret sharing a flag e: $=e_0, \ldots, e_{m-1}$ indicating that a last element of each group is true and other elements are false when the table is grouped based on the value of the key attribute, $\{\{\sigma\}\}$ being a share obtained by secret sharing a permutation $\sigma$ which moves elements so that the last elements of each group are sequentially arranged from beginning when the table is grouped based on the value of the key attribute, and g being a maximum number of the groups, the secure aggregate sum method comprising securely:

generating, by processing circuitry of each of the secure computation apparatuses, a share $[V']$ which becomes a vector v': $=v'_0, \ldots, v'_{m-1}$, when reconstructed, by setting a sum from $v_0$ to $v_i$ at $v'_i$ for each integer i equal to or greater than 0 and equal to or less than m−1 using the share $[v]$;

generating, by the processing circuitry of each of the secure computation apparatuses, a share $[t]$ which becomes a vector t: $=t_0, \ldots, t_{m-1}$, when reconstructed, by setting $[v'_i]$ at $[t_i]$ if $[e_i]$ is true, and setting $[v'_{m-1}]$ at $[t_i]$ if $[e_i]$ is false for each integer i equal to or greater than 0 and equal to or less than m−1 using the share $[v']$ and the share $[e]$;

generating, by the processing circuitry of each of the secure computation apparatuses, a share $[\sigma(t)]$ which becomes a sorted vector $\sigma(t)$ obtained by sorting the vector t with the permutation $\sigma$, when reconstructed, using the share $[t]$ and the share $\{\{\sigma\}\}$; and generating, by the processing circuitry of each of the secure computation apparatuses, a share $[s]$ which becomes a vector s: $=s_0, \ldots, s_{min(g, m)-1}$ representing a sum of value attributes v for each group, when reconstructed, by setting $[S_i]$: $=[\sigma(t)_i - \sigma(t)_{i-1}]$ for each integer i equal to or greater than 1 and equal to or less than min(g, m)−1, and setting $[s_0]$: $=[\sigma(t)_0]$ using the share $[\sigma(t)]$, wherein the method further comprises:

receiving $[v]$, $[e]$, and $\{\{\sigma\}\}$ through secret sharing, and outputting the share $[s]$.

5. A non-transitory computer-readable recording medium on which a program recorded thereon for causing a computer to function as the secure computation apparatus according to claim 3.

* * * * *

UNITED STATES PATENT AND TRADEMARK OFFICE
CERTIFICATE OF CORRECTION

PATENT NO. : 11,595,194 B2
APPLICATION NO. : 17/049341
DATED : February 28, 2023
INVENTOR(S) : Dai Ikarashi It is certified that error appears in the above-identified patent and that said Letters Patent is hereby corrected as shown below:

In the Claims

Column 9, Line 33, In Claim 2, the first recitation of "e" should read --negation $\neg e$--.

Column 9, Line 64, In Claim 3, the recitation "$[v'_{m-1}$" should read --$[v'_{m-1}]$--.

Column 9, Line 66, In Claim 3, the recitation "$[V']$" should read --$[v']$--.

Column 10, Line 15, In Claim 4, the recitation "Secure aggregate" should read --A secure aggregate--.

Column 10, Line 34, In Claim 4, the recitation "$[V']$" should read --$[v']$--.

Column 10, Line 55, In Claim 4, the recitation "$[S_i]$" should read --$[s_i]$--.

Signed and Sealed this
Twentieth Day of June, 2023

Katherine Kelly Vidal
*Director of the United States Patent and Trademark Office*